United States Patent
Clark (10) Patent No.: US 8,499,323 B2
(45) Date of Patent: Jul. 30, 2013

(54) METHOD AND APPARATUS FOR OUTPUTTING MEDIA CONTENT

(75) Inventor: Dean Clark, Bristol (GB)

(73) Assignee: Nvidia Corporation, Santa Clara, CA (US)

(*) Notice: Subject to any disclaimer, the term of this patent is extended or adjusted under 35 U.S.C. 154(b) by 1081 days.

(21) Appl. No.: 12/104,306

(22) Filed: Apr. 16, 2008

(65) Prior Publication Data

US 2009/0265735 A1    Oct. 22, 2009

(51) Int. Cl.
*H04N 7/16* (2011.01)

(52) U.S. Cl.
USPC .............................. 725/62; 725/37; 455/3.01

(58) Field of Classification Search
USPC ................... 455/3.06, 3.01, 424, 426, 115.1, 455/67.11, 414.3, 456.3, 518, 519, 560, 431, 455/127.1, 127.2, 452.2, 454, 73; 370/486, 370/203, 208, 328, 389, 352, 206, 210; 725/112, 725/113, 116, 109, 105, 111, 80, 90, 146, 725/62, 100, 96; 348/E7.013, E7.016, E7.086, 348/E7.071, E7.019, 461, E7.056
See application file for complete search history.

(56) References Cited

U.S. PATENT DOCUMENTS

| | | | |
|---|---|---|---|
| 2007/0190928 A1* | 8/2007 | Nichols et al. | 455/3.01 |
| 2007/0223535 A1* | 9/2007 | Hamazaki | 370/486 |
| 2008/0022340 A1* | 1/2008 | Hannuksela et al. | 725/112 |
| 2008/0062990 A1* | 3/2008 | Oran | 370/392 |

FOREIGN PATENT DOCUMENTS

| | | |
|---|---|---|
| CN | 1728788 A | 2/2006 |
| WO | 2006105010 A1 | 10/2006 |

OTHER PUBLICATIONS

International Search Report and Written Opinion dated Jan. 20, 2010 from PCT/EP2009/053899.
Communication Pursuant to Article 94(3) EPC from European Patent Application No. 09 733 056.7-1224 issued on Apr. 1, 2011.

\* cited by examiner

*Primary Examiner* — Edward Urban
*Assistant Examiner* — Golam Sorowar (57) ABSTRACT

A mobile communication device comprises receiver circuitry operable to receive broadcast real-time media data over a communication interface, and signal processing logic operable to extract real-time media content from the broadcast real-time media data, and output the extracted real-time media content via a user interface of the mobile communication device. In response to determining a partial loss of data for the broadcast real-time media data, the signal processing logic is operable to retrieve stored media content from a memory element of the mobile communication device, and output the retrieved media content via the user interface of the communication device.

23 Claims, 5 Drawing Sheets

METHOD AND APPARATUS FOR OUTPUTTING MEDIA CONTENT

FIELD OF THE INVENTION

The field of the invention relates to a method and apparatus for outputting media content, and in particular to a method and apparatus for outputting media content on a mobile communication device during at least partial loss of communication coverage.

BACKGROUND OF THE INVENTION

Multimedia Broadcast Multicast Service (MBMS) is a broadcasting and multicasting service offered over mobile telecommunications networks such as General System for Mobile communication (GSM) networks, General Packet Radio System (GPRS) networks, Universal Mobile Telecommunication System (UMTS) networks, and the like. The technical specifications for MBMS include 3GPP (3$^{rd}$ Generation Partnership Project) TS 22.146 and 3GPP TS 23.246.

Mobile television (TV) is an example of a service that may be provided over MBMS. Mobile TV is a service to subscribers via mobile telecommunications networks, providing television services to mobile devices.

Figure 1:
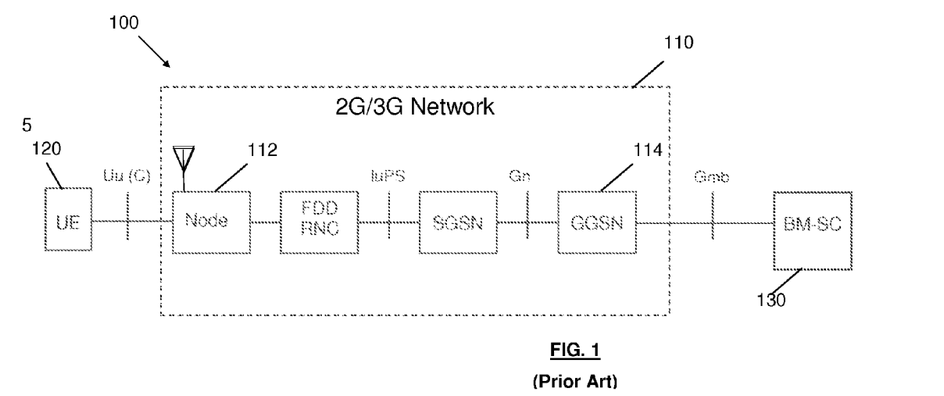
FIG. 1 illustrates an example of a known architecture for providing Multimedia Broadcast Multicast Service (MBMS).

FIG. 1 illustrates an example of a known architecture 100 for providing MBMS. The architecture 100 comprises an operator network 110, such as a GSM, GPRS or UMTS network.

The operator network 110 comprises a node 112, such as a base station, which is wirelessly coupled to one or more user equipment (UE) devices, a UE comprising by way of example a mobile telephone handset. The operator network 110 further comprises a Gateway GPRS Support Node (GGSN) 114, which is coupled to a Broadcast Multicast Service Centre (BM-SC) 130.

The BM-SC 130 is adapted to provide content, for example Mobile TV content, to the UE 120, by way of broadcasting and/or multicasting content streams. The operator network 110 advertises, or otherwise provides, information publicising available content to UE 120. The UE 120 is then able to request from the operator network 110 the content that it wishes to receive (e.g. subscribe to).

The operator network 110 subsequently informs the BM-SC 130 of the requested content, and informs the UE 120 of the channel(s) on which the requested content will be available, as well as any encryption keys etc. for accessing the content. The BM-SC 130 then provides the content to the network 110, from which the UE 120 is able to obtain the content. As will be appreciated by a skilled artisan, the content may alternatively be provided over a shared MBMS network, as opposed to the operator network 130 such as that illustrated in FIG. 1

Alternative, competing technologies capable of providing Mobile TV and other media services to mobile devices include, by way of example, DVB-H (Digital Video Broadcasting-Handheld), which is a mobile television format for providing broadcast services to mobile handsets, and is defined in ETSI (European Telecommunications Standards Institute) standard EN 302 304. DVB-H is a superset of DVB-T (Digital Video Broadcasting-Terrestrial), a system for digital terrestrial television, with additional features to meet the specific requirements of handheld, battery-powered receivers.

A problem with mobile communication devices is that they experience variable RF (Radio Frequency) coverage and multipath propagation conditions whilst on the move. Accordingly, a mobile communication device receiving media content, for example by way of MBMS or DVB-H, can experience partial or complete data loss when the mobile communication device moves outside of an 'adequate' coverage area.

The effect of such partial data loss during playback of media content being received by the mobile communication device may result in simple anomalies in, for example, the video or audio output, which may be deemed acceptable in some circumstances. However, such partial or complete data loss may result in a complete loss of audio and/or video output.

During such a loss of audio and/or video output, a typical reaction of a user is to change 'channel' in an attempt to find an alternative media stream. This is known as channel hopping. However, due to the nature of broadcast media technologies, alternative channels are often broadcast on the same frequencies and from the same node (e.g. base station). Consequently, by changing channels, the user may often find that the other channels are also experiencing a loss of data.

As will be appreciated by a skilled artisan, a loss of audio and/or video output is detrimental to a user's experience, which is worsened when alternative channels are also experiencing data loss. Furthermore, receive buffers used within digital media receivers can typically take one or more seconds to fill before playback begins. Accordingly, each time a user changes channel, there is a noticeable delay, thereby further impairing the user's experience.

Thus, there exists a need for an improved method and apparatus for outputting media content on a mobile communication device.

SUMMARY OF THE INVENTION

According to a first aspect of the invention, there is provided a mobile communication device comprising receiver circuitry operable to receive real-time media data signals broadcast over a communications interface, and signal processing logic operable to extract real-time media content from the broadcast real-time media data signal, and output the real-time media content via a user interface of the communication device. In response to determining at least partial loss of data for the real-time media content, the signal processing logic is operable to retrieve stored media content from a memory element of the communication device, and output the stored media content via the user interface of the communication device, instead of the real-time media content.

Thus, embodiments of the invention may allow stored media content to be output in place of real-time media content during periods of poor coverage. In this manner, when the mobile communication unit experiences partial or complete data loss for the real-time media content when it moves outside of an adequate coverage area, instead of a user experiencing poor quality (if any) real-time media content playback, stored media content is output to the user via the user interface, improving the user's experience. As a result, a user is less likely to channel hop, which would further degrade the user experience due to alternative channels being likely to also suffer from the same loss of signal, as well as any inherent delay in buffering these alternative real-time signals.

By offering stored content, such as an entire episode or film previously captured from the live broadcast that is yet to be viewed, it is possible to at least generate the perception of greater bandwidth (i.e. more available channels) than the physical air interface is capable of hosting. Furthermore, this may be presented to the end user as an additional channel with the stored content listed within the electronic program guide as, say, "showing now".

According to an optional feature of the invention, the signal processing logic may be further operable to revert back to outputting real-time media content extracted from the broadcast real-time media data signal via the user interface of the communication device in response to determining a quality of service of the communications interface subsequently exceeding a particular level. In this manner, a user may be able to return to watching/listening to the original real-time media channel as soon as the mobile communication device returns to an adequate coverage area, substantially minimising the inconvenience experienced by the user.

According to a further optional feature of the invention, the communications interface may comprise an air interface.

According to a further optional feature of the invention, in response to receiving at least a partial loss of data for the real-time media content extracted from the broadcast real-time media data signal, the signal processing logic may be operable to attempt to establish a unicast connection via the communications interface. The unicast connection may be used to receive an alternative real-time media data signal, and from which real-time media content is extracted for outputting via the user interface. Optionally, if the signal processing logic is unable to establish a reliable unicast connection over which to receive an alternative real-time media data signal, the signal processing logic may be operable to retrieve the stored media content from the memory element of the communication device and output the stored media content to the user via the user interface. In this manner, the stored media content may be output only if the real-time media channel cannot be received either by a broadcast bearer signal or a unicast bearer signal.

According to an optional feature of the invention, the signal processing logic may be operable to retrieve stored media content from memory comprising a class of data as determined by one or more of: the real-time media content; a user profile; a time of day and/or date.

According to an optional feature of the invention, the stored media content may comprise one or more of the following categories of media content: advertisements; sports clips, highlights, scores and/or interviews; news clips and/or headlines.

According to an optional feature of the invention, the signal processing logic may be operable to download media content via the communications interface and store it in the memory element of the communication device for subsequent retrieval, in response to receiving at least partial loss of data for broadcast real-time media content.

According to an optional feature of the invention, the signal processing logic may be operable to download media content via a communication facility other than the communications interface over which real-time media data signals are broadcast.

According to an optional feature of the invention, the signal processing logic may be operable to download media content for storing in memory during periods of inactivity for the receiver circuitry or periodically.

According to an optional feature of the invention, the signal processing logic may be operable to download media content for storing in memory periodically.

According to an optional feature of the invention, stored media content may comprise time-dependent restrictions. The signal processing logic may be operable to only retrieve stored media content that is valid with respect to the time-dependent restrictions, the time-dependent restrictions may comprise one or more of: an expiry date, after which the media content is no longer valid; a date range within which the media content is valid; daily time periods within which the media content is valid; and/or one or more individual dates on which the media content is valid.

According to an optional feature of the invention, in response to the at least partial loss of data for the media content being extracted from the broadcast real-time media signal, the signal processing logic may be further operable to suspend a reception of real-time media data signals over the communications interface by the receiver circuitry until a quality of service of the interface exceeds a particular, say minimum, limit. In this manner, battery power consumption of the mobile communication device may be reduced.

According to an optional feature of the invention, the signal processing logic may be further operable to retrieve stored media content from a memory element of the communication device, and output the stored media content via the user interface of the communication device, in response to determination that the media content extracted from the broadcast real-time media signal is unsuitable and/or undesirable according to a user profile.

According to an optional feature of the invention, the signal processing logic may be operable to notify a user of the at least partial loss of data for the real-time media content prior to outputting the stored media content via the user interface. In this manner, the transition between outputting real-time media content and stored media content may be improved, in particular if the mobile communication device experiences sudden complete real-time content data loss.

According to an optional feature of the invention, the real-time media data signal may comprise a Multimedia Broadcast Multicast Service (MBMS) streaming service, or a Digital Video Broadcasting-Handheld (DVB-H) streaming service.

According to a second aspect of the invention, there is provided a method for outputting media content on a mobile communication device. The method comprises, receiving a real-time media data signal broadcast over a communications interface, extracting real-time media content from the broadcast media data signal, and outputting the real-time media content via a user interface of the mobile communication device. The method further comprises detecting at least a partial loss of data for the real-time media content, retrieving stored media content from a memory element of the communication device, and outputting the stored media content via a user interface of the communication device, for example instead of the real-time media content.

According to a third aspect of the invention, there is provided a mobile communication system comprising a node for wireless communicating with a mobile communication device adapted according to the first aspect of the invention.

According to a fourth aspect of the invention, there is provided a computer-readable storage element having computer-readable code stored thereon for programming signal processing logic to perform the method for outputting media content on a mobile communication device according to the second aspect of the invention.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DESCRIPTION OF EMBODIMENTS OF THE INVENTION

Embodiments of the invention will be described in a context of a mobile telephone handset, for example one that is adapted to communicate over a Universal Mobile Telecommunications System (UMTS) Radio Access Network (UTRAN) system. However, it will be appreciated that embodiments of the invention are not limited to a mobile telephone handset, but may be implemented within alternative communication devices with which media data content can be received over an interface.

Figure 2:
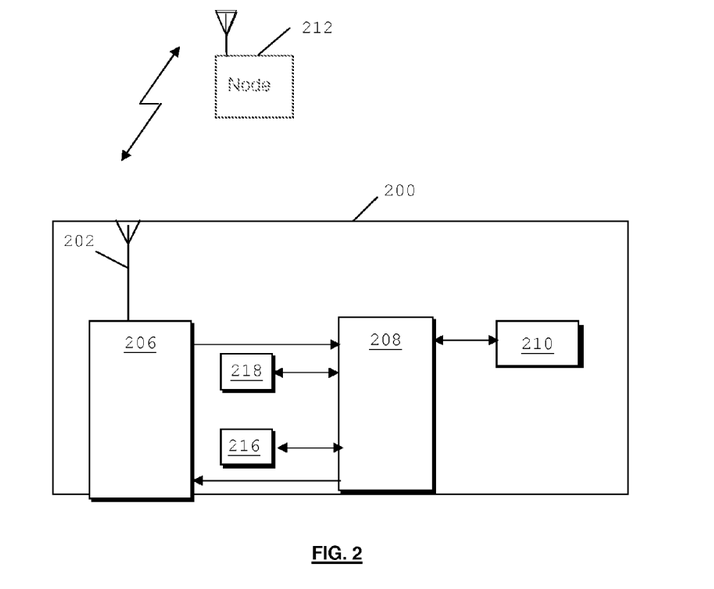
FIG. 2 illustrates a block diagram of part of a mobile communication system comprising a mobile communication device according to embodiments of the invention.

Referring now to FIG. 2, there is illustrated a block diagram of part of a mobile communication system that comprises an access node 212 wirelessly coupled to a mobile communication device 200 over an air interface, wherein the mobile communication device 200 is adapted to support embodiments of the invention.

The mobile communication device 200, in the context of the illustrated embodiments of the invention, is a user equipment (UE) in a form of a mobile telephone handset comprising an antenna 202. As such, the communication device 200 contains a variety of well known Radio Frequency (RF) components or circuits 206 comprising receiver circuitry and transmitter circuitry, operably coupled to the antenna 202 that will not be described further herein. The communication device 200 further comprises signal processing logic 208. An output from the signal processing logic 208 is provided to a suitable user interface (UI) 210 comprising, for example, a display, keypad, loudspeaker and/or microphone.

The signal processing logic 208 is coupled to a memory element 216 that stores operating regimes, such as decoding/encoding functions and the like and may be realised in a variety of technologies, such as random access memory (RAM) (volatile), (non-volatile) read only memory (ROM), Flash memory or any combination of these or other memory technologies. A timer 218 is typically coupled to the signal processing logic 208 to control the timing of operations within the communication device 200.

In accordance with embodiments of the invention, receiver circuitry is operable to receive real-time media data signals broadcast over a communications interface. For example, for the embodiment illustrated in FIG. 2, the communications interface may comprise an air interface provided between the communication unit 200 and a Node-B 212 or base station (not shown) of a UMTS cellular communications network, and the real-time media data signals may be broadcast using a Multimedia Broadcast Multicast Service (MBMS), a DVB-H (Digital Video Broadcasting-Handheld) service, or similar media streaming service. Furthermore, the signal processing logic 208 is operable to extract real-time media content from the broadcast real-time media data signal, and output the real-time media content via the user interface 210 of the communication device 200.

As previously mentioned, a problem with mobile communication devices is that they experience variable RF (Radio Frequency) coverage and/or multipath propagation conditions whilst on the move. Accordingly, a mobile communication device receiving real-time media content, for example by way of MBMS or DVB-H, can experience partial or complete data loss when the mobile communication device moves outside of an 'acceptable' coverage area. The effect of such partial data loss during playback of media content being received by the mobile communication device may result in simple anomalies in, for example, the video or audio output, which may be deemed acceptable in some circumstances. However, such partial or complete data loss may result in a complete loss of audio and/or video output.

Therefore, in accordance with embodiments of the invention, in response to receiving and determining at least a partial loss of data for the real-time media content, the signal processing logic 208 is operable to retrieve stored media content from a memory element of the UE 200, for example memory element 216, and output the stored media content via the user interface 210 of the UE 200, instead of the real-time media content.

In this manner, stored media content may be output in place of real-time media content during periods of poor coverage. Accordingly, when the UE 200 experiences partial or complete data loss for the real-time media content, for example when it moves outside of an acceptable coverage area, instead of a user experiencing poor quality (if any) real-time media content playback, stored media content is output, thereby improving the user's experience. As a result, a user is less likely to channel hop, which would further degrade the user's experience due to alternative channels being likely to also suffer from the same loss of signal, as well as the inherent delay in buffering these alternative real-time signals.

For clarity, the term 'real-time media' refers to media content received in a form of a stream of data, and intended to be output substantially as it is received, albeit with some delay due to the use of buffers, for example to prevent jitter. In particular, the term 'real-time media' as used herein is not limited to media comprising 'live' content, such as live coverage of a sporting event or the like. Additionally, the term 'media' may refer to any form of media data, such as audio and/or video data, capable of being output via a user interface of a communication device.

As will be appreciated by a skilled artisan, loss of data may result from poor signal strength or quality, poor network coverage, external interference or environmental conditions. Accordingly, loss of data may be determined by way of analysing received data within the UE 200 using known Quality of Service (QoS) techniques. Such QoS techniques may include, by way of example only, receive buffer starvation detection.

Receive buffer starvation detection is a simple method of detecting data loss caused by poor coverage or data corruption and relies on sequence numbers embedded within the transport protocol. For example, data transferred within a RTP/RTCP packet will have a sequence number associated with it. If this packet fails to reach the UE or fails checksum due to corruption, a gap will occur within the receive buffer. Receive buffer starvation can be detected by simple analysis of the packet sequence numbers. It is envisaged that other QoS techniques may be used, such as MPEG Watermarking, which implements a more sophisticated method of QoS detection by checking for a known pattern within the received data, as understood by a skilled artisan.

Figure 3:
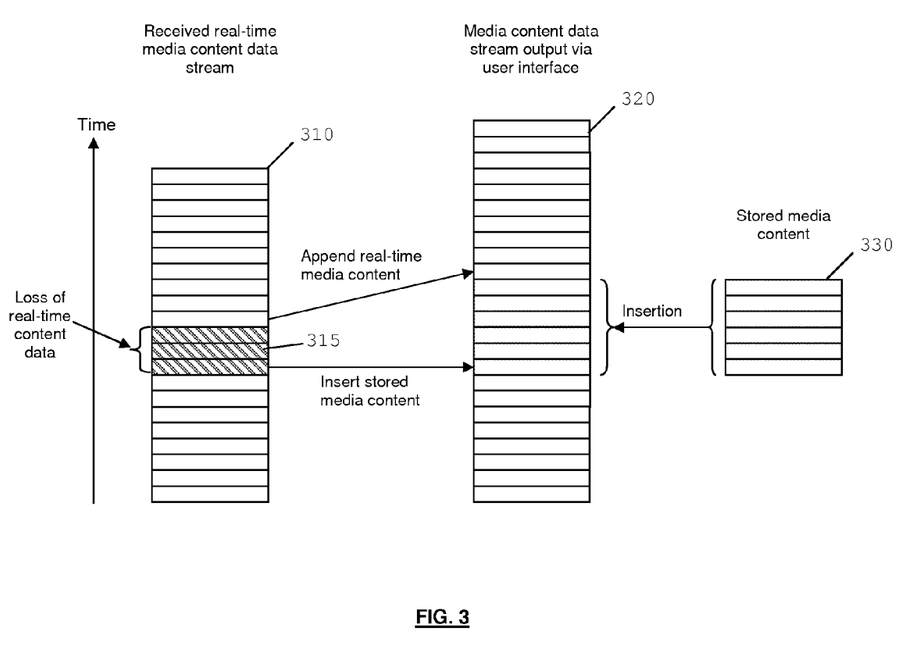
FIG. 3 illustrates an example of outputting media content according to embodiments of the invention.

FIG. 3 illustrates an example of outputting media content according to embodiments of the invention. A real-time media content data stream is illustrated at 310, and an output media content data stream is illustrated at 320. The output media content data stream 320 represents media content output via a user interface of a communication device, such as UE 200 of FIG. 2.

As previously mentioned, the signal processing logic 208 of UE 200 is operable to extract real-time media content from a broadcast real-time media data signal, and output the real-time media content via a user interface 210 of UE 200. Accordingly, for the embodiment illustrated in FIG. 3, the real-time media content data stream 310 represents extracted real-time media content, which is inserted into the output media content data stream 320 for outputting via the user interface 210 of FIG. 2.

Also illustrated in FIG. 3 is a partial loss of real-time content data, illustrated at 315. In response to determining such a partial loss of data for the real-time media content 315, the signal processing logic 208 of the UE 200 of FIG. 2 retrieves stored media content 330 from memory, and inserts the stored media content into the output media content data stream 320 for outputting via the user interface 210.

The signal processing logic 208 may be further operable to revert back to outputting real-time media content in response to identifying a quality of service of the communications interface that subsequently exceeds, say, a minimum level, and thereby substantially ensuring at least a minimum quality of outputted media content.

In accordance with one or more embodiments of the invention, it is contemplated that it may be inappropriate for intermittent data losses of short duration to cause a transition to stored media content, since this may degrade a user's perceived experience. This is particularly the case if such intermittent data losses are frequent. To avoid this, due to the use of internal buffers, a gap in a real-time media transmission exceeding a predetermined duration (say, of four seconds), may be detected internally by the UE 200. In response to detection of such a gap in a real-time media transmission, the UE 200 may then retrieve stored media from memory to substitute for the loss of real-time data.

For the embodiment illustrated in FIG. 3, when the integrity of the real-time media content data stream 310 is once again sufficient, for example when the UE 200 of FIG. 2 re-enters an area of acceptable coverage, the real-time media content is once again inserted into the output media content data stream 320 for outputting via the user interface 210 of UE 200 of FIG. 2.

Also for the embodiment illustrated in FIG. 3, the stored media content may comprise media clips of short, but, for example, set duration. For example, the stored media content may comprise clips of one or more of the following categories of media content: advertisements; sports clips, highlights, scores and/or interviews; news clips and/or headlines.

In one embodiment of the invention, it is envisaged that such stored media content for displaying to a user via the user interface may be based on a user profile.

Thus, for the illustrated embodiment, when the integrity of the real-time media content data stream 310 is once again sufficient, the real-time media content may be inserted into the output media content data stream 320 after the end of the current stored media content being output. In this manner, a smooth transition from stored media content to real-time media content may be achieved.

As will be appreciated by a skilled artisan, by waiting for the current stored media content 'clip' to finish, the real-time media content may become delayed. As a result, a delay in the outputting of the real-time media content may be discernible by a user of the communication device. To overcome this, real-time media content may be discarded whilst the stored media content is being allowed to finish, in order to maintain a substantially up-to-date outputting of the real-time media content once the stored media content has finished.

In accordance with embodiments of the invention, in response to receiving at least a partial loss of data for the real-time media content extracted from the broadcast real-time media data signal, the signal processing logic 208 may be operable to attempt to establish a unicast connection via the communications interface, over which to receive an alternative real-time media data signal. If the signal processing logic 208 is unable to establish a reliable unicast connection over which to receive an alternative real-time media data signal, it may then retrieve the stored media content from the memory element of the mobile communication device and output the stored media content to the user via the user interface. In this manner, the stored media content is output only if the real-time media channel cannot be received, either by a broadcast bearer signal or a unicast bearer signal.

As will be appreciated by a skilled artisan, a unicast bearer may be offered by any operator providing mobile data services such as TD-CDMA (Time Division-Code Division Multiple Access), EGPRS (Enhanced General Packet Radio Service) or WiMAX (Worldwide Interoperability for Microwave Access). The UE may establish a unicast connection to the unicast bearer provider, which once authenticated may forward duplicate real-time media content to the UE.

In accordance with embodiments of the invention, the signal processing logic 208 may further be operable to retrieve stored media content, from memory, comprising a specific class of data. For example, the signal processing logic 208 may retrieve stored media content that is determined as being similar to the real-time media content. In this manner, a user may be provided with content comprising a similar subject matter, or the like, to the real-time media content.

Alternatively, the signal processing logic 208 may retrieve stored media content as determined by a user profile. In this manner, the user may be provided with content comprising a subject matter of specific interest to the user.

For example, where content information is available to the UE during playback of media content, it is envisaged that the UE may build up a profile of content type regularly accessed by a user. This profile information may then be used to download, or otherwise store in memory, media content of potential interest to the user, for subsequent retrieval during periods of data loss.

Alternatively still, it is envisaged that the signal processing logic 208 may retrieve stored media content as determined by a time of day, day of the week and/or date. In this manner, the user may be provided with content comprising a subject matter that is relevant to the particular time of day (e.g. morning or evening), a particular day of the week (e.g. weekday or weekend), and/or to particular date (e.g. Christmas, Easter, Summer, Winter, etc.).

The signal processing logic 208 of UE 200 of FIG. 2 may be operable to download media content via the communications interface, and store it in the memory element 216 for subsequent retrieval in response to receiving at least a partial loss of broadcast real-time media content. In particular, the signal processing logic 208 may be operable to download media content for storing in memory during periods of inactivity for the receiver circuitry 206.

Alternatively, the signal processing logic 208 may be operable to download media content via a communication facility, i.e., communication means, other than the communications interface over which real-time media data signals are broadcast. For example, the signal processing logic 208 may be operable to download media content via a Universal Serial Bus (USB) connection, an Ethernet connection, etc.

It is envisaged that the signal processing logic 208 of UE 200 of FIG. 2 may be operable to download media content for storing in memory periodically. In this manner, stored media content, such as news, may be regularly updated or changed. Furthermore, it is envisaged that the stored media content may comprise time-dependent restrictions. Accordingly, the signal processing logic 208 may be operable to only retrieve stored media content that is valid with respect to the time-dependent restrictions at the time of retrieval. For example, the time-dependent restrictions may comprise one or more of:

(i) an expiry date, after which the media content is no longer valid;
(ii) a date range within which the media content is valid;
(iii) daily time periods within which the media content is valid; and/or
(iv) one or more individual dates on which the media content is valid.

In accordance with embodiments of the inventions, in response to determining the at least partial loss of data for the media content extracted from the broadcast real-time media signal, the signal processing logic 208 may be further operable to suspend the reception of real-time media data signals over the communications interface by the receiver circuitry 206 until a quality of service of the interface exceeds, say, a minimum quality level. In this manner, battery power consumption of the communication device 200 may be reduced when in areas of poor coverage.

It is further contemplated that the signal processing logic 208 may be further operable to retrieve stored media content from memory, and output the stored media content via the user interface 210 of the UE 200, in response to a determination that the media content extracted from the broadcast real-time media signal being unsuitable and/or undesirable, for example according to a user profile. Thus, the signal processing logic 208 may comprise comparison logic operable to compare received or stored real-time media with characteristics of a user's profile.

For example, a user profile may be setup for a child, and in response to a determination that the media content extracted from the broadcast real-time media signal comprises adult content, the signal processing logic 208 outputs more appropriate stored media content related to a child, instead of the unsuitable real-time adult content.

In accordance with embodiments of the invention, the signal processing logic 208 may further be operable to notify a user of the at least partial loss of data for the real-time media content, prior to outputting the stored media content via the user interface. In this manner, the transition between outputting real-time media content and stored media content may be improved, in particular if the mobile communication device (UE) experiences sudden complete real-time content data loss.

Figure 4:
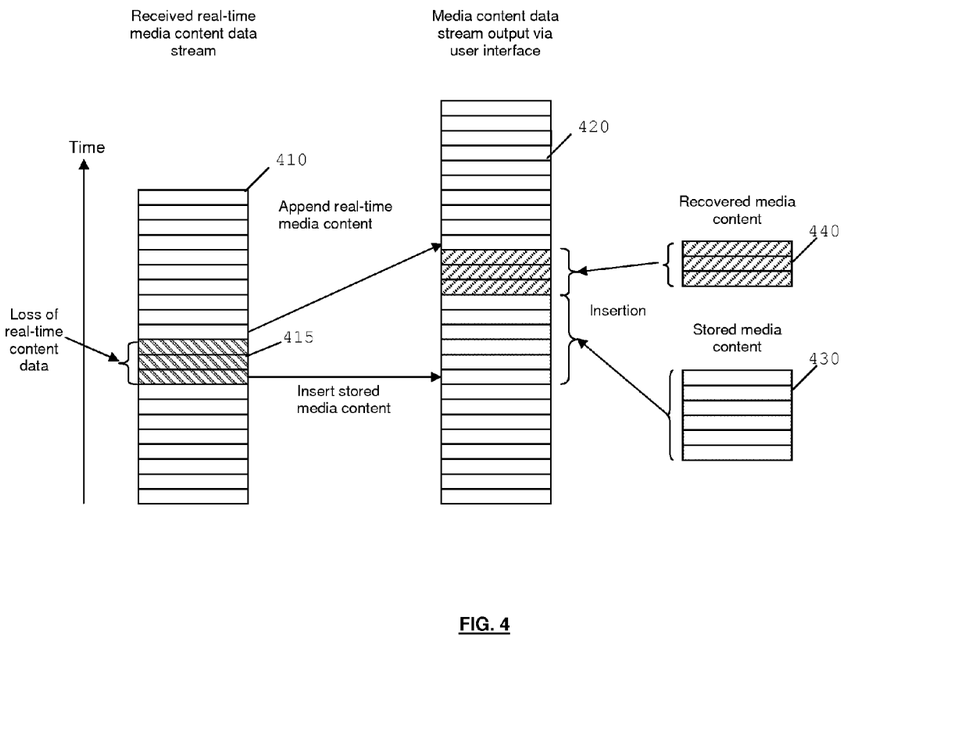
FIG. 4 illustrates an example of outputting media content according to embodiments of the invention.

Referring now to FIG. 4, there is illustrated an example of outputting media content according to embodiments of the invention. A real-time media content data stream is illustrated at 410, and an output media content data stream is illustrated at 420. The output media content data stream 420 represents media content output via a user interface of a communication device, such as the UE 200 of FIG. 2. Furthermore, the real-time media content data stream 410 represents extracted real-time media content, which is inserted into the output media content data stream 420 for outputting via the user interface 210.

Also illustrated in FIG. 4 is a partial loss of real-time content data, illustrated at 415. In response to receiving such a partial loss of data for the real-time media content 415, the signal processing logic 208 retrieves stored media content 430 from memory, and inserts the stored media content 430 into the output media content data stream 420 for outputting via, say, the user interface 210 of FIG. 2.

In accordance with the embodiment illustrated in FIG. 4, in response to receiving the partial loss of data for the real-time media content 415, the signal processing logic 208 is further operable to attempt to establish a unicast connection (not shown), for example with an operator providing mobile data services such as TD-CDMA, EGPRS WiMAX, etc., and in response to establishment of a unicast connection to request the lost real-time media content. In response to a subsequent receipt of the lost real-time media content 440, the signal processing logic 208 may then insert the recovered real-time media content 440 into the output media content data stream 420 for outputting via the user interface 210.

For the illustrated embodiment of FIG. 4, in response to an integrity of the received real-time media content returning to a sufficient quality, for example exceeding a threshold level, the signal processing logic 208 of FIG. 2 is further operable to buffer real-time media content extracted from the broadcast real-time media data signal until lost real-time media content requested via the unicast connection has been recovered and output via the user interface.

Figure 5:
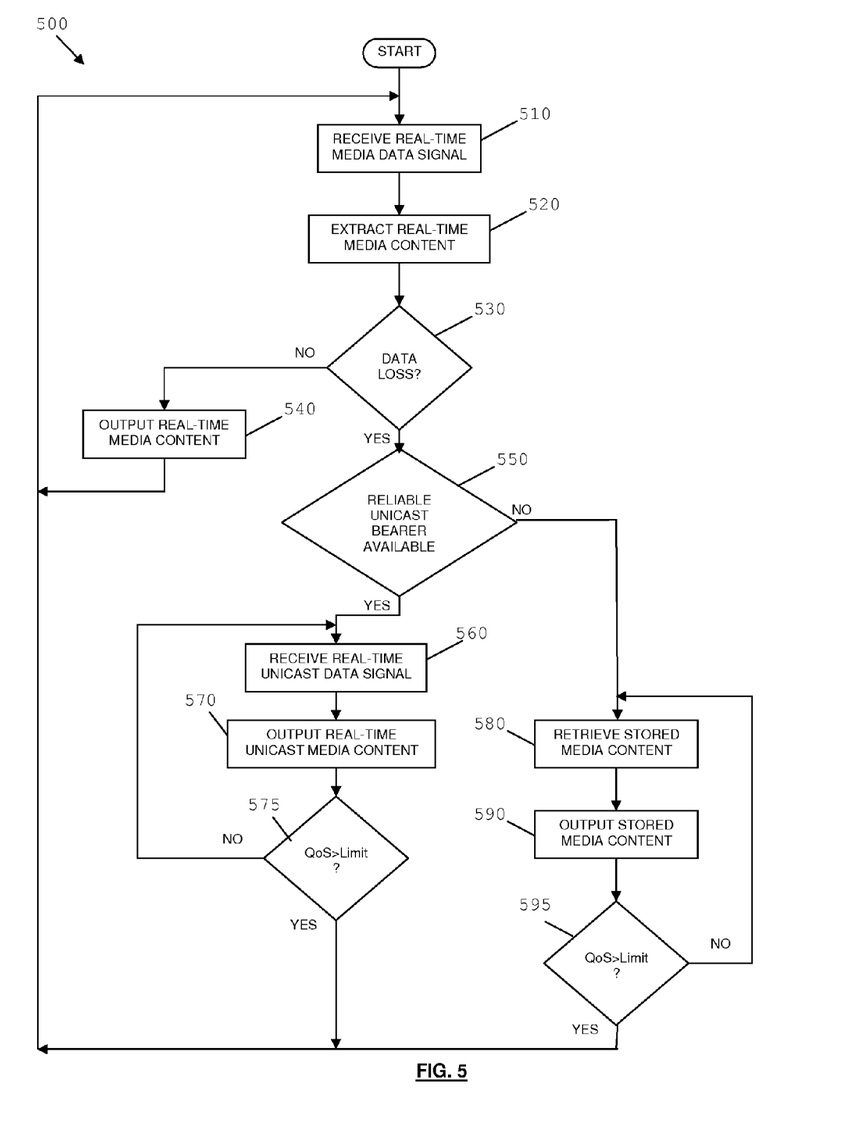
FIG. 5 illustrates a simplified flowchart of a method for outputting media content on a mobile communication device according to embodiments of the invention.

Referring now to FIG. 5, there is illustrated a simplified flowchart 500 of a method for outputting media content on a mobile communication device according to embodiments of the invention. For example, the method may be implemented by signal processing logic 208 of UE 200 of FIG. 2.

The method starts and moves to step 510 where a real-time media data signal broadcast over a communications interface is received. Next, in step 520, real-time media content is extracted from the broadcast media data signal. The method then moves to step 530, where it is determined whether at least a partial loss of real-time media content has occurred.

If it is determined that at least a partial loss of real-time media content has not occurred, the method moves to step 540, where the real-time media content is output via a user interface of the UE. The method then loops back to step 510.

However, if at least a partial loss of real-time media content is detected, for the illustrated embodiment the method moves to step 550, where it is determined whether a reliable unicast bearer is available for providing real-time media content. If it is determined that a reliable unicast bearer is available, the method moves to step 560, where real-time unicast media content is received via the unicast bearer. Next, in step 570, the received real-time unicast media content is output via the user interface of the UE.

The method then moves to step 575, wherein it is determined whether a Quality of Service (QoS) of either the real-time media data signal broadcast over a communications interface or the real-time media content extracted from the broadcast media data signal, exceeds, say, a minimum level. If the QoS does not exceed a minimum level, the method loops back to step 560 and continues outputting real-time unicast media content. However, if the QoS does exceed a minimum level, the method loops back to step 510, in order to resume outputting broadcast real-time media content.

Referring back to step 550, for the case where it is determined that no reliable unicast bearer is available, the method moves to step 580, where stored media content is retrieved from a memory element of the UE. Next, in step 590, the retrieved stored media content is output via the user interface of the UE, instead of the real-time media content.

Next, in step 595, it is determined whether a Quality of Service (QoS) of either the real-time media data signal broadcast over a communications interface or the real-time media content extracted from the broadcast media data signal, exceeds, say, a minimum level. If the QoS does not exceed a minimum level, the method loops back to step 580 and continues outputting stored media content. However, if the QoS does exceed a minimum level, the method loops back to step 510, in order to resume outputting real-time media content.

Figure 6:
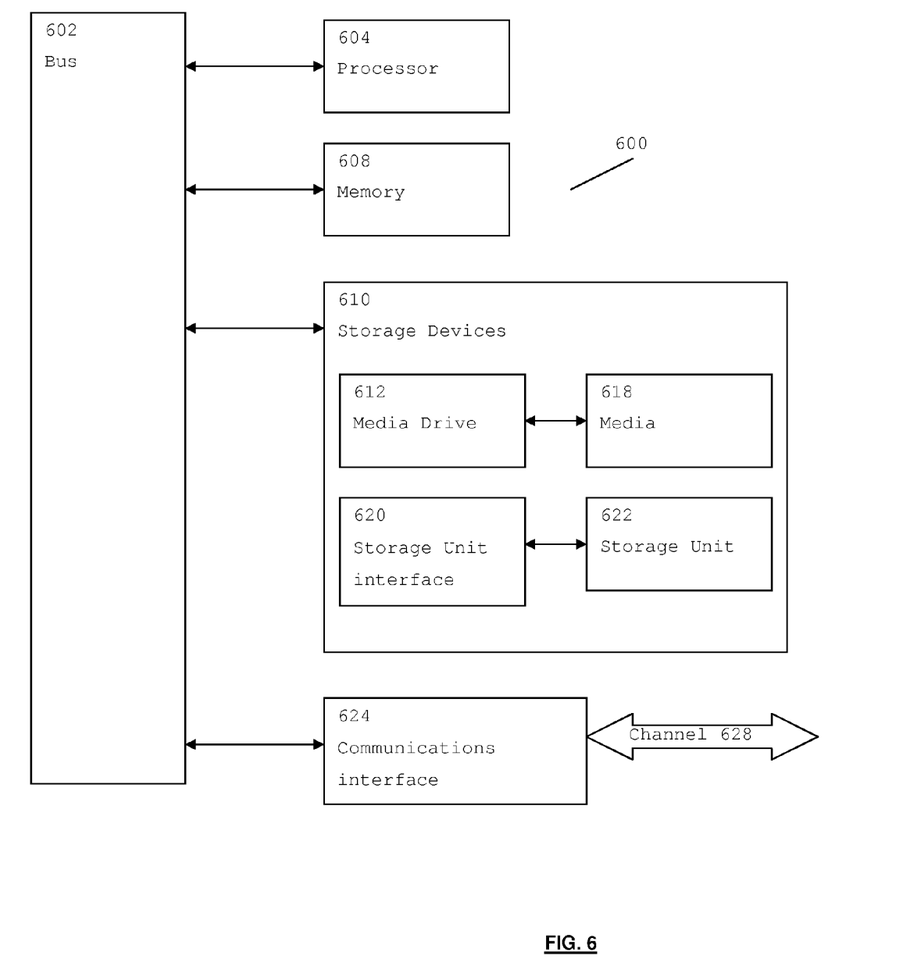
FIG. 6 illustrates a typical computing system that may be employed to implement processing functionality in embodiments of the invention.

FIG. 6 illustrates a typical computing system 600 that may be employed to implement processing functionality in embodiments of the invention. Computing systems of this type may be used in the communication device (which may be an integrated device, such as a mobile phone or a USB/PCMCIA modem), for example. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communications medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory (ROM) or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a universal serial bus (USB) port), a PCMCIA slot and card, etc. Software and data transferred via communications interface 624 are in the form of signals which can be electronic, electromagnetic, and optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

In this document, the terms 'computer program product' 'computer-readable medium' and the like may be used generally to refer to media such as, for example, memory 608, storage device 618, or storage unit 622. These and other forms of computer-readable media may store one or more instructions for use by processor 604, to cause the processor to perform specified operations. Such instructions, generally referred to as 'computer program code' (which may be grouped in the form of computer programs or other groupings), when executed, enable the computing system 600 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A mobile communication device comprising:
   receiver circuitry operable to receive broadcast real-time media data over a communication interface; and
   signal processing logic operable to extract real-time media content from the broadcast real-time media data, and to output the extracted real-time media content via a user interface of the mobile communication device,
   wherein, in response to determining at least a partial loss of real-time media content extracted from the broadcast real-time media data, the signal processing logic is operable to:
   attempt to establish a unicast connection with a serving communication unit via the communication interface, over which to receive second real-time media data, and from which to extract second real-time media content for outputting via the user interface; and
   in response to the signal processing logic being unable to establish the unicast connection over which to receive the second real-time media data, the signal processing logic is further operable to:
   retrieve stored media content from a memory element of the mobile communication device that is different from the real-time media content, and to
   output the retrieved media content via the user interface of the mobile communication device.

2. The mobile communication device of claim 1 wherein the signal processing logic is operable to output the real-time media content extracted from the broadcast real-time media data via the user interface of the mobile communication device in response to determining a quality of service of the extracted real-time media content subsequently exceeding a threshold level.

3. The mobile communication device of claim 1 wherein the communication interface comprises an air interface.

4. The mobile communication device of claim 1 wherein the signal processing logic is operable to retrieve the stored media content from the memory element of the mobile communication device in response to detecting a gap in the broadcast real-time media data exceeding a predetermined duration.

5. The mobile communication device of claim 1 wherein the signal processing logic is operable to retrieve the stored media content according to a class of media data determined by at least one from a group of:
   the real-time media content;
   a user profile;
   a time of day;
   a date.

6. The mobile communication device of claim 1 wherein the stored media content comprises at least one from a group of media content categories comprising:
   advertisements; sports clips, highlights, scores, interviews; news clips, headlines, or a combination thereof.

7. The mobile communication device of claim 1 wherein the signal processing logic is operable to download media content for storing in memory in at least one of:
   during periods of inactivity of the mobile communication device;
   periodically.

8. The mobile communication device of claim 1 wherein, in response to determining at least a partial loss of data for the real-time media content extracted from the broadcast real-time media data, the signal processing logic is operable to download real-time media data via a communication facility other than the communication interface over which broadcast real-time media data is received.

9. The mobile communication device of claim 1 wherein the stored media content comprises time-dependent restrictions.

10. The mobile communication device of claim 9 wherein the signal processing logic is operable to only retrieve stored media content that is valid with respect to the time-dependent restrictions at a time of retrieval.

11. The mobile communication device of claim 9 wherein the time-dependent restrictions comprise at least one from a group of:
    an expiry date, after which media content is no longer valid;
    a date range within which media content is valid;
    a daily period of time within which media content is valid;
    at least one date on which media content is valid.

12. The mobile communication device of claim 1 wherein, in response to determining at least a partial loss of data for the broadcast media content extracted from the broadcast real-time media data, the signal processing logic is further operable to suspend a reception of broadcast real-time media data over the communication interface by the receiver circuitry.

13. The mobile communication device of claim 1 wherein the signal processing logic is operable to retrieve the stored media content from a memory element of the mobile communication device and to output the stored media content via the user interface of the mobile communication device, in response to determination that at least a portion of the media content extracted from the broadcast real-time media data does not match data according to a user profile.

14. The mobile communication device of claim 1 wherein the signal processing logic is operable to display on the user interface an indication that a partial loss of broadcast real-time data has occurred prior to outputting the retrieved media content via the user interface.

15. The mobile communication device of claim 1 wherein, in response to determining a partial loss of received data of the broadcast real-time media data, the signal processing logic is operable to establish a connection to request lost real-time media content, and in response to subsequent receipt of the lost real-time media content, the signal processing logic is further operable to output the lost real-time media content via the user interface.

16. The mobile communication device of claim 15, wherein, in response to the signal processing logic determining that a quality of the real-time media content exceeds a threshold level, the signal processing logic is operable to buffer media content extracted from the broadcast real-time media data until the lost real-time media content has been output via the user interface.

17. The mobile communication device of claim 1 wherein the broadcast real-time media data comprises a Multimedia Broadcast Multicast Service (MBMS) streaming service.

18. The mobile communication device of claim 1 wherein the broadcast real-time media data comprises a Digital Video Broadcasting-Handheld (DVB-H) streaming service.

19. The mobile communication device of claim 1 wherein, the signal processing logic is operable to attempt to establish a unicast connection with a serving communication unit via the communication interface, over which to receive second real-time media data, in response to determining a complete loss of real-time media content extracted from the broadcast real-time media data.

20. A computer-enabled method for outputting media content on a mobile communication device, the method comprising, at the mobile communication device:
  receiving broadcast real-time media data over a communication interface;
  extracting real-time media content from the broadcast real-time media data; and
  outputting the extracted real-time media content via a user interface of the mobile communication device;
  determining a partial loss of received real-time media content extracted from the broadcast real-time media data;
  attempting to establish a unicast connection with a serving communication unit via the communication interface, over which to receive second real-time media data, and from which to extract real-time media content for outputting via the user interface; and
  determining an inability to establish the unicast connection over which to receive the second real-time media data; and based thereon
  retrieving stored media content from a memory element of the mobile communication device that is different from the real-time media content; and
  outputting the retrieved stored media content via the user interface of the mobile communication device.

21. A mobile communication system comprising a node for wirelessly communicating with a mobile communication device, the system comprising:
  receiver circuitry operable to receive broadcast real-time media data over a communication interface; and
  signal processing logic operable to extract real-time media content from the broadcast real-time media data, and to output the extracted real-time media content via a user interface of the mobile communication device,
  wherein, in response to determining a partial loss of real-time media content extracted from the broadcast real-time media data, the signal processing logic is operable to:
  attempt to establish a unicast connection with a serving communication unit via the communication interface, over which to receive second real-time media data, and from which to extract real-time media content for outputting via the user interface; and
  in response to the signal processing logic being unable to establish the unicast connection over which to receive the second real-time media data, the signal processing logic is further operable to:
  retrieve stored media content from a memory element of the mobile communication device that is different from the real-time media content; and
  output the retrieved media content via the user interface of the mobile communication device.

22. A non-transitory computer program product having executable program code stored thereon for outputting media content on a mobile communication device, the program code operable for, when executed at the mobile communication device:
  receiving broadcast real-time media data over a communication interface;
  extracting real-time media content from the broadcast real-time media data; and
  outputting the extracted real-time media content via a user interface of the mobile communication device,
  determining a partial loss of received real-time media content extracted from the broadcast real-time media data;
  attempting to establish a unicast connection with a serving communication unit via the communication interface, over which to receive second real-time media data, and from which to extract real-time media content for outputting via the user interface; and
  determining an inability to establish the unicast connection over which to receive the second real-time media data; and based thereon
  retrieving stored media content from a memory element of the mobile communication device that is different from the real-time media content; and
  outputting the retrieved media content via the user interface of the mobile communication device.

23. The non-transitory computer program product of claim 22, wherein the computer readable medium comprises at least one of a hard disk, a CD-ROM, an optical storage device, a magnetic storage device, a ROM (Read Only Memory), a PROM (Programmable Read Only Memory), a EPROM (Erasable Programmable Read Only Memory), a EEPROM (Electrically Erasable Programmable Read Only Memory) and a Flash memory.

* * * * *